United States Patent
Jain et al.

(10) Patent No.: US 9,374,236 B2
(45) Date of Patent: Jun. 21, 2016

(54) NETWORK DEVICE WITH TUNNEL ESTABLISHMENT CONTROL BASED ON SITE-TYPE ATTRIBUTE RECEIVED FROM OTHER NETWORK DEVICE

(71) Applicant: Alcatel-Lucent USA Inc., Murray Hill, NJ (US)

(72) Inventors: Pradeep G. Jain, Sunnyvale, CA (US); Jayant Kotalwar, Cupertino, CA (US); Girish Birajdar, Fremont, CA (US); Geetha Remadevi, Sunnyvale, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 587 days.

(21) Appl. No.: 13/859,367

(22) Filed: Apr. 9, 2013

(65) Prior Publication Data

US 2014/0301392 A1    Oct. 9, 2014

(51) Int. Cl.
*H04L 12/18*    (2006.01)
*H04L 12/46*    (2006.01)
(Continued)

(52) U.S. Cl.
CPC .......... *H04L 12/1886* (2013.01); *H04L 12/185* (2013.01); *H04L 12/4633* (2013.01); *H04L 12/4641* (2013.01); *H04L 45/16* (2013.01); *H04L 63/20* (2013.01)

(58) Field of Classification Search
CPC   F24F 11/006; F24F 2011/0067; H04L 63/20; H04L 12/4633; H04L 12/185; H04L 12/4641; H04L 45/16
See application file for complete search history.

(56) References Cited

U.S. PATENT DOCUMENTS

| 7,751,405 B1 | 7/2010 | Kompella |
| 7,756,072 B1 | 7/2010 | Fenner et al. |
| 7,983,261 B1 | 7/2011 | Aggarwal et al. |

(Continued)

FOREIGN PATENT DOCUMENTS

| CN | 1852236 A | 10/2006 |
| CN | 101001194 A | 7/2007 |

(Continued)

OTHER PUBLICATIONS

Y. Rekhter et al., "A Border Gateway Protocol 4 (BGP-4)," Network Working Group, Request for Comments: 4271, Jan. 2006, 104 pages.

(Continued)

*Primary Examiner* — Raj Jain
(74) *Attorney, Agent, or Firm* — Ryan, Masori & Lewis, LLP (57) ABSTRACT

In one embodiment, a first network device is configured to receive from a second network device a site-type attribute of the second network device, and to control establishment of a tunnel between the first network device and the second network device based at least in part on the received site-type attribute. The site-type attribute may be received in the first network device as part of a Border Gateway Protocol (BGP) message transmitted by the second network device to the first network device, and may comprise a Multicast Virtual Private Network (MVPN) site-type attribute indicating whether the second network device is a sender site of the MVPN. Controlling establishment of the tunnel between the first network device and the second network device may comprise preventing setup of the tunnel if the received site-type attribute indicates that the second network device is a sender site of the MVPN.

20 Claims, 3 Drawing Sheets

(51) Int. Cl.
*H04L 12/761* (2013.01)
*H04L 29/06* (2006.01)

(56) References Cited

U.S. PATENT DOCUMENTS

| | | | | |
|---|---|---|---|---|
| 9,100,201 | B1* | 8/2015 | Pichumani | H04L 12/185 |
| 2006/0088031 | A1* | 4/2006 | Nalawade | H04L 12/185 370/390 |
| 2007/0140251 | A1* | 6/2007 | Dong | H04L 12/4645 370/392 |
| 2012/0109383 | A1* | 5/2012 | Richards | F24F 11/006 700/275 |
| 2014/0301392 | A1* | 10/2014 | Jain | H04L 12/1886 370/390 |

FOREIGN PATENT DOCUMENTS

| | | |
|---|---|---|
| EP | 2512067 A1 | 10/2012 |
| WO | PCTUS2014033126 | 7/2014 |

OTHER PUBLICATIONS

E. Rosen et al., "BGP/MPLS IP Virtual Private Networks (VPNs)," Network Working Group, Request for Comments: 4364, Feb. 2006, 47 pages.
J. De Clercq et al., "BGP-MPLS IP Virtual Private Network (VPN) Extension for IPv6 VPN," Network Working Group, Request for Comments: 4659, Sep. 2006, 18 pages.
E. Rosen et al., "Multicast in MPLS/BGP IP VPNs," Internet Engineering Task Force (IETF), Request for Comments: 6513, Feb. 2012, 88 pages.
R. Aggarwal et al., "BGP Encodings and Procedures for Multicast in MPLS/BGP IP VPNs," Internet Engineering Task Force (IETF), Request for Comments: 6514, Feb. 2012, 60 pages.
Juniper Networks, Inc., "NGEN MVPN BGP Route Types and Encodings, Examples for Easy Reference," www.juniper.net, Application Note, Nov. 2008, 4 pages.
Wikipedia, "Finite-State Machine," http://en.wikipedia.org/wiki/Border_Gateway_Protocol, Apr. 2013, 2 pages.

* cited by examiner

NETWORK DEVICE WITH TUNNEL ESTABLISHMENT CONTROL BASED ON SITE-TYPE ATTRIBUTE RECEIVED FROM OTHER NETWORK DEVICE

FIELD

The field relates generally to communication networks, and more particularly to communication protocols implemented using network devices of such networks.

BACKGROUND

Communication service providers often implement Virtual Private Networks (VPNs) for their customers. For example, VPNs may be provided using Internet Protocol (IP), Border Gateway Protocol (BGP) and Multiple Protocol Label Switching (MPLS) in accordance with the techniques disclosed in Internet Engineering Task Force (IETF) Request for Comments (RFC) 4364, entitled "BGP/MPLS IP Virtual Private Networks (VPNs)," which is incorporated by reference herein. The companion standard for VPNs in IPv6 networks is RFC 4659, entitled "BGP-MPLS IP Virtual Private Network (VPN) Extension for IPv6 VPN," which is also incorporated by reference herein. IP VPN services based on RFC 4364 and RFC 4659 have been deployed extensively by service providers around the world.

VPNs configured in accordance with RFC 4364 and RFC 4659 connect customer sites via tunnels, and allow IP unicast packets to travel from one customer site to another. However, these VPNs do not provide a way for IP multicast traffic to travel from one customer site to another.

The unicast VPN services defined in RFC 4364 and RFC 4659 can be extended to include the capability of handling IP multicast traffic, using the techniques disclosed in RFC 6513, entitled "Multicast in MPLS/BGP IP VPNs," which is incorporated by reference herein. VPNs configured in accordance with RFC 6513 are considered examples of what are more generally referred to herein as multicast VPNs (MVPNs). Such MVPNs are typically configured to support the transmission of IP multicast packets between customer sites using multicast tunnels.

SUMMARY

We have determined that conventional MVPN arrangements such as those defined by RFC 6513 are problematic in that under certain circumstances a significant number of unnecessary tunnels may be established, leading to inefficient use of network resources and degraded network performance.

Illustrative embodiments of the present invention provide communication networks in which a given network device utilizes a site-type attribute sent to it by another network device to control establishment of at least one tunnel with that device. Such arrangements help to avoid unnecessary tunneling associated with an MVPN, thereby conserving network resources and improving network performance.

In one embodiment, a first network device is configured to receive from the second network device a site-type attribute of the second network device and to control establishment of a tunnel between the first network device and the second network device based at least in part on the received site-type attribute. The site-type attribute may be received in the first network device as part of a BGP message transmitted by the second network device to the first network device, and may comprise an MVPN site-type attribute indicating whether the second network device is a sender site of the MVPN.

By way of example, controlling establishment of the tunnel between the first network device and the second network device may comprise preventing setup of the tunnel if the received site-type attribute indicates that the second network device is a sender site of the MVPN.

The first and second network devices in some embodiments may comprise respective routers or other provider elements associated with an IP-MPLS network, although it is to be appreciated that numerous other types of network devices and communication networks may be used in other embodiments.

DETAILED DESCRIPTION

Illustrative embodiments of the invention will be described herein with reference to exemplary communication networks, network devices and associated communication protocols. It should be understood, however, that the invention is not limited to use with the particular arrangements described, but is instead more generally applicable to any communication network application in which it is desirable to provide improved performance by controlling tunneling between network devices.

Figure 1:
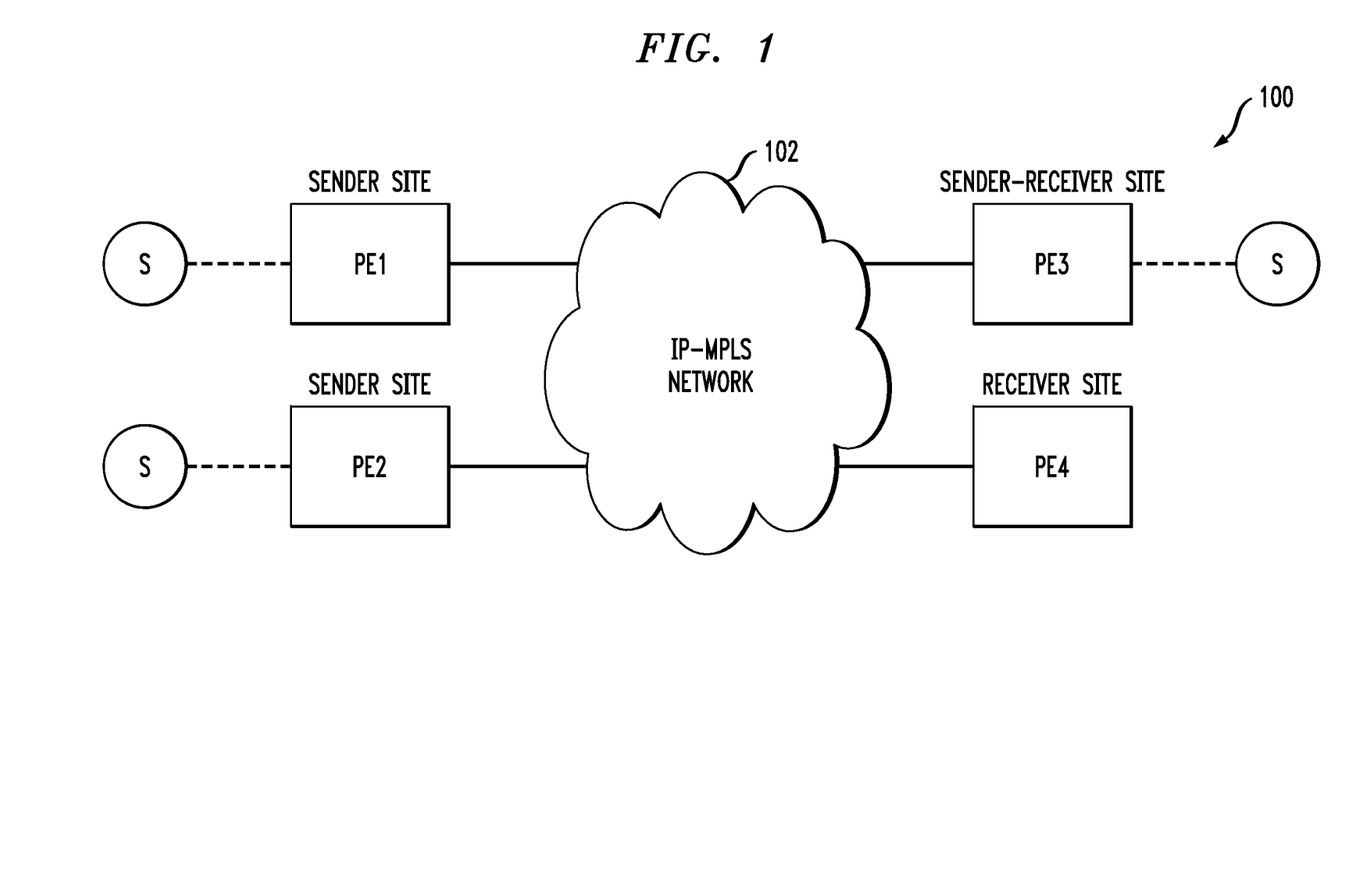
FIG. 1 shows a communication network that implements functionality for tunnel establishment control based on site-type attributes in an illustrative embodiment of the invention.

FIG. 1 shows a communication network 100 that includes a number of provider edge (PE) elements PE1, PE2, PE3 and PE4 interconnected by an IP-MPLS network 102. Certain of the PE elements are coupled to corresponding multicast sources each denoted S. Each of the PE elements PE1, PE2, PE3 and PE4 represents a site of at least one MVPN and is characterized as being one of a sender-receiver site, a sender site, and a receiver site. More particularly, in this embodiment, sites PE1 and PE2 are sender sites, PE3 is a sender-receiver site, and PE4 is a receiver site.

These designations are examples of what are more generally referred to herein as "site types" of the PE elements. It is to be appreciated that this particular arrangement of site type designations is exemplary only, and further that the site type of a given PE element of the communication network 100 can change over time. Moreover, other embodiments may utilize additional or alternative sets of site types. In other words, site types herein are not limited to only the sender, receiver and sender-receiver types described above in the context of network 100. The term "site" as used herein is therefore also intended to be broadly construed.

The above-cited RFC 6513 illustratively defines a given MVPN as comprising two distinct sets of sites, namely, a Sender Sites set and a Receiver Sites set, with the following properties:

1. Sites in the Sender Sites set can originate multicast traffic to sites in the Receiver Sites set.

2. Sites not in the Receiver Sites set should not be able to receive multicast traffic originated by any site that is in the Sender Sites set.

3. Sites in the Receiver Sites set can receive multicast traffic originated by any site in the Sender Sites set.

4. Sites in the Receiver Sites set should not be able to receive multicast traffic originated by any site that is not in the Sender Sites set.

A sender-receiver site such as PE3 is both a sender site and a receiver site, and therefore a single PE element may be in both the Sender Sites set and the Receiver Sites set.

A PE element closest to the source S of a given MVPN is referred to as a root PE element of that MVPN. Such a PE element may be connected directly to the source S or connected via one or more network devices of one or more networks. A given tunnel carrying multicast traffic for the MVPN would originate at the root PE element.

A PE element that comprises or is associated with a receiver site of the given MVPN is referred to as a leaf PE element of that MVPN. The given tunnel carrying multicast traffic for the MVPN would terminate at a leaf PE element.

It should be understood, however, that MVPNs herein are not limited to those configured in accordance with RFC 6513, and a wide variety of other MVPN arrangements can be used in embodiments of the invention.

The PE elements and multicast sources may be considered examples of respective nodes of the network 100. Numerous other types and arrangements of nodes may be used in other embodiments. Thus, for example, other types of provider elements may be used that are not necessarily PE elements. The term "node" as used herein is intended to be broadly construed, and accordingly may comprise, for example, an entire network device or one or more components of a network device.

The nodes of the communication network 100 may be fixed or mobile. Accordingly, various combinations of fixed and mobile nodes may be used in a given communication network, while other networks may comprise all fixed nodes or all mobile nodes. Each of the nodes in a given communication network may be configured in substantially the same manner, or different configurations may be used for different subsets of the nodes within a given network.

It is assumed for certain embodiments disclosed herein that each such node corresponds to a separate network device. The network devices may comprise routers, switches, computers or other processing devices, in any combination. A given network device will generally comprise a processor and a memory coupled to the processor, as well as one or more transceivers or other types of network interface circuitry which allow the network device to communicate with the other network devices. The PE elements PE1, PE2, PE3 and PE4 of the communication network 100 are therefore considered examples of what are more generally referred to herein as "network devices."

As mentioned previously, conventional MVPN arrangements such as those defined by RFC 6513 are problematic in that under certain circumstances a significant number of unnecessary tunnels may be established, leading to inefficient use of network resources and degrading network performance.

Multicast tunnels established for a given MVPN make efficient use of network links by avoiding traffic replication to individual receiver sites. These tunnels are unidirectional with respect to multicast traffic. In accordance with RFC 6513, each site is generally required to establish connectivity via tunnels to respective peer sites. However, for a given sender site of the MVPN, tunnels that originate from respective receiver sites and terminate at the given sender site are unutilized, leading to wasteful use of limited network resources such as forwarding records in the corresponding network devices, as well as other control plane and data plane resources.

This can be particularly problematic in applications in which there a relatively small number of sender sites and a relatively large number of receiver sites. One such application is IP television, in which program content is multicast from one or more sender sites to a large number of receiver sites that do not themselves generate multicast traffic. In these and other similar applications, tunnels established between the receiver sites and the sender sites are often unnecessary and wasteful of network resources, particularly for large scale networks.

With reference to the FIG. 1 embodiment, tunnels that would ordinarily be established between PE pairs in accordance with RFC 6513 include P-tunnels of a Provider Multicast Service Interface (PMSI), which may comprise an Inclusive PMSI (I-PMSI) or a Selective PMSI (S-PMSI). More particularly, a P-tunnel would typically be set up between pairs of the PE elements, even between a receiver site such as PE4 and a sender site such as PE1 or PE2. Accordingly, both PE1 and PE2 will have terminating P-tunnels that originate from PE4, even though traffic arriving on these P-tunnels will be dropped because PE1 and PE2 are sender sites. It is therefore apparent that many P-tunnels that would ordinarily be established in the network 100 under conventional practice are unnecessary since in the MVPN traffic flows from the sender sites to the receiver sites.

This problem is addressed in one or more embodiments of the present invention by utilizing a site-type attribute to control establishment of P-tunnels and possibly other types of tunnels. For example, as will be described in more detail below, such an arrangement can avoid the establishment of unnecessary P-tunnels between receiver sites and sender sites of an MVPN.

More particularly, each of the PE elements PE1, PE2, PE3 and PE4 of communication network 100 is assumed to be configured to utilize a site-type attribute sent to it by another one of the PE elements in order to control establishment of at least one tunnel with that PE element. This can help to avoid unnecessary tunneling between receiver sites and sender sites associated with a corresponding MVPN, thereby conserving network resources and improving network performance. A "site-type attribute" as that term is used herein may comprise a BGP attribute or any other arrangement of information that can be used to convey an indication of site type from one network device to another.

Figure 2:
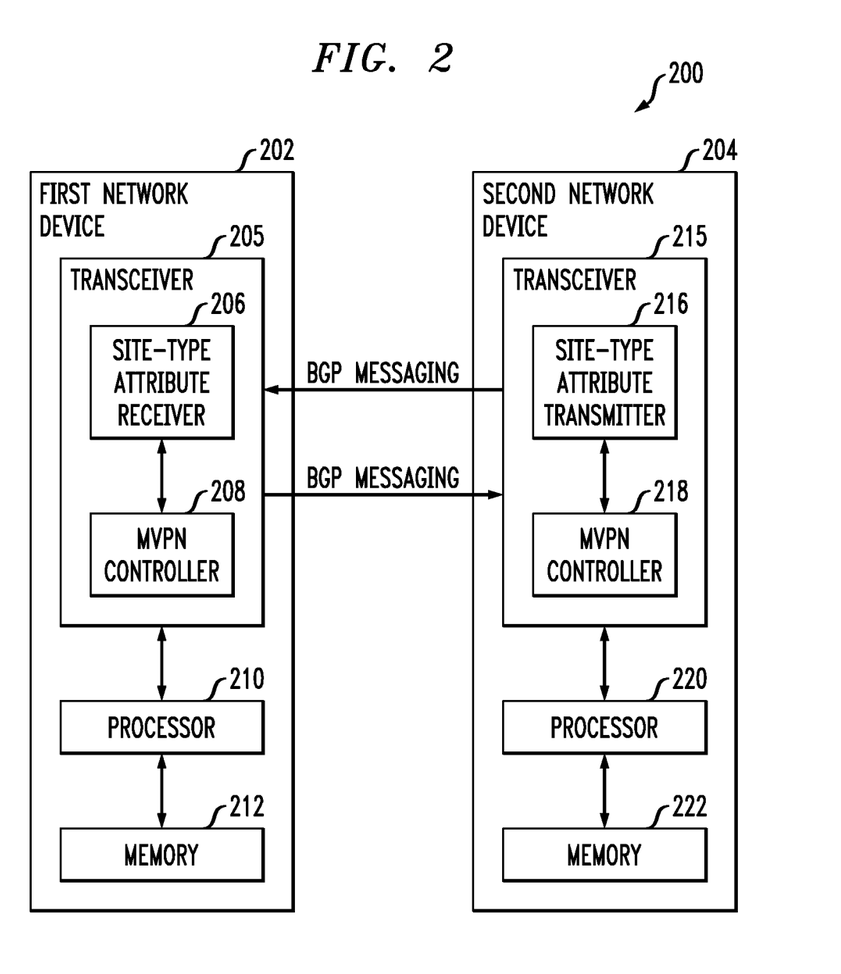
FIG. 2 is a more detailed view of first and second network devices in one possible implementation of the FIG. 1 network.

The tunnel establishment control functionality of communication network 100 is illustrated in more detail in FIG. 2, which shows a portion 200 of the network 100 including first and second network devices 202 and 204 which may correspond to a given pair of the PE elements PE1, PE2, PE3 and PE4 of FIG. 1.

In the FIG. 2 embodiment, the first network device 202 is adapted for communication with the second network device 204, and vice versa. The first network device 202 comprises a transceiver 205 that includes a site-type attribute receiver 206 coupled to an MVPN controller 208. The first network device 202 further comprises a processor 210 coupled to the transceiver 205 and to a memory 212. The second network device 204 comprises a transceiver 215 that includes a site-type attribute transmitter 216 coupled to an MVPN controller 218. The second network device 204 further comprises a processor 220 coupled to the transceiver 215 and to a memory 222.

Also in the FIG. 2 embodiment, BGP messages are exchanged between the transceivers 205 and 215 under direction of the MVPN controllers 208 and 218. These elements are assumed to implement MVPN functionality similar to that described in the above-cited RFC 6513, but suitably modified to support use of site-type attributes for controlling establishment of tunnels as disclosed herein.

More particularly, the site-type attribute in this embodiment is a new BGP attribute for a BGP-based MVPN that allows a given PE element to inform other PE elements as to whether the given PE element is a sender site or a receiver site of the MVPN. This attribute is used in this embodiment, for example, to prevent receiver site PE elements from establishing tunnels with sender site PEs, which reduces control plane states in the network and allows for more efficient network bandwidth utilization.

The new BGP attribute can be implemented as an optional transitive BGP attribute that is advertised or otherwise transmitted by the given PE element to all other PE elements in a corresponding I-PMSI or S-PMSI auto-discovery (A-D) route. Details regarding conventional aspects of BGP and A-D routes in the context of MVPNs are disclosed in RFC 6514, entitled "BGP Encodings and Procedures for Multicast in MPLS/BGP IP VPNs," which is incorporated by reference herein.

It is to be appreciated that the particular arrangement of network device components shown in FIG. 2 is exemplary only, and numerous alternative network device configurations may be used in other embodiments. For example, the network devices can be configured to incorporate support for numerous other types of messaging in accordance with other communication protocols.

The first network device 202 is generally configured to receive from the second network device 204 a site-type attribute of the second network device 204 and to control establishment of a tunnel between the first and second network devices based at least in part on the received site-type attribute. More particularly, the site-type attribute receiver 206 is configured to extract the site-type attribute from a message received from the second network device 204, and the MVPN controller 208 coupled to the site-type attribute receiver 206 is configured to prevent setup of the tunnel if the received site-type attribute indicates that the second network device is a sender site of an MVPN.

Although FIG. 2 illustrates first network device 202 as including a site-type attribute receiver and second network device 204 as including a site-type attribute transmitter, both site-type attribute receiver and transmitter elements will typically be included in both network devices. Accordingly, each of these two network devices may utilize a site-type attribute received from the other network device to control establishment of tunnels with the other network device.

Figure 3:
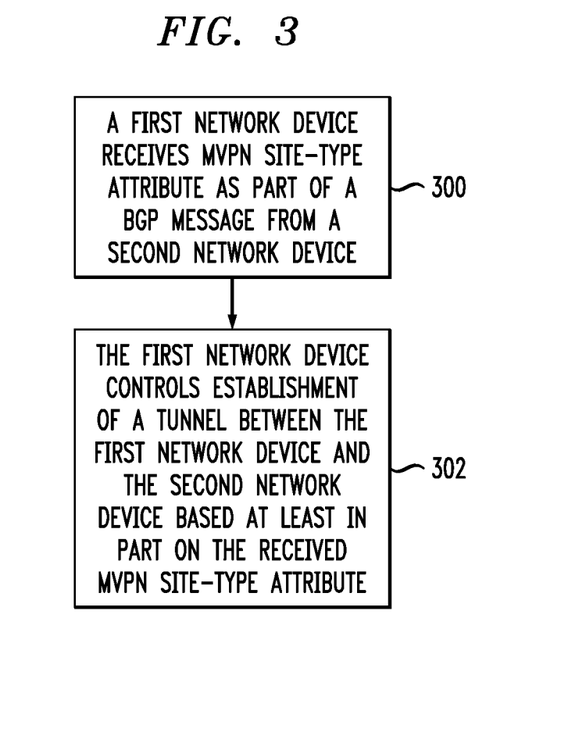
FIG. 3 is a flow diagram of a tunnel establishment control process carried out using the first and second network devices of FIG. 2.

This exemplary tunnel establishment control process involving first and second network devices 202 and 204 is generally illustrated in the flow diagram of FIG. 3, which includes steps 300 and 302 that are assumed to be performed by the first network device 202 responsive to information transmitted by the second network device 204.

In step 300, the first network device 202 receives a site-type attribute from the second network device 204. It is assumed that the site-type attribute is received in the first network device 202 as part of a BGP message transmitted by the second network device 204 to the first network device 202. It is further assumed that the site-type attribute comprises an MVPN site-type attribute indicating whether the second network device is a sender site, a receiver site, or a sender-receiver site of an MVPN. As indicated previously, other site-type attributes can be used in other embodiments. Also, such site-type attributes need not be transmitted from one network device to another in BGP messages, but could instead be communicated between network devices using a wide variety of different communication techniques.

Figure 4:
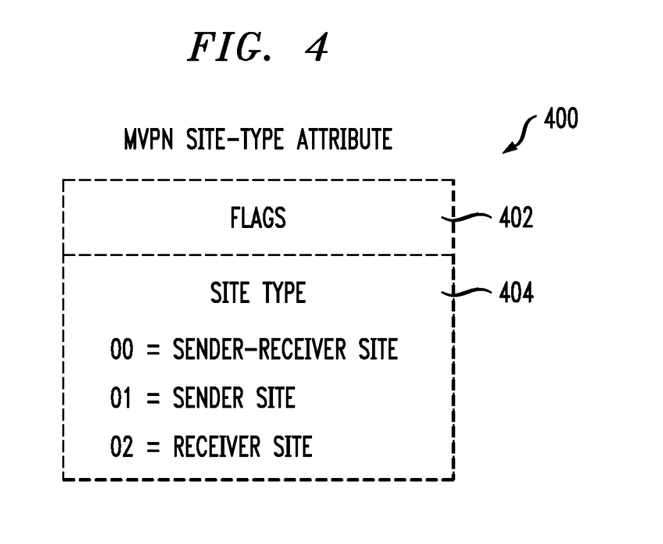
FIG. 4 shows one possible configuration of an exemplary MVPN site-type attribute utilized by the network devices of FIG. 2.

As illustrated in FIG. 4, an exemplary MVPN site-type attribute 400 may be configured to take on a particular one of a plurality of different possible values, including a first value indicating that the second network device is both a sender site and a receiver site of the MVPN, a second value indicating that the second network device is a sender site of the MVPN, and a third value indicating that the second network device is a receiver site of the MVPN.

In the FIG. 4 embodiment, the MVPN site-type attribute more particularly includes at least first and second fields 402 and 404, with the first field 402 comprising a plurality of flags that may be reserved for other functionality, and the second field 404 comprising the current site type of the sending network device 204. Here, values of 00, 01 and 02 are used to denote the sending network device as being one of a sender-receiver site, a sender site and a receiver site, respectively. In the present embodiment, it is assumed that the first and second fields 402 and 404 have lengths of one octet and two octets, respectively. An Internet Assigned Numbers Authority (IANA) type code may be assigned to the MVPN site-type attribute.

Again, different sets of site types and corresponding values, fields and field lengths may be used. One of the values may be designated as a default value. For example, in the FIG. 4 embodiment, the value 00, denoting the sending network device as a sender-receiver site, is considered a default value of the MVPN attribute 400.

Returning now to the flow diagram of FIG. 3, the first network device 202 in step 302 controls establishment of a tunnel between the first network device 202 and the second network 204 device based at least in part on the received site-type attribute. By way of example, controlling establishment of the tunnel between the first network device 202 and the second network device 204 may comprise controlling establishment of a P-tunnel between the first and second network devices. More particularly, controlling establishment of the P-tunnel between the first network device 202 and the second network device 204 in the present embodiment comprises preventing setup of the P-tunnel if the received site-type attribute has a particular predetermined value, in this case a value of 01 indicating that the second network device 204 is a sender site of an MVPN.

Thus, for example, if the first network device 202 is assumed to correspond to receiver site PE4 of FIG. 1 and the second network device 204 is assumed to correspond to sender site PE1 of FIG. 1, the sender site PE1 transmits its current site-type attribute value 01 indicating that it is a sender site. The receiver site PE4 receives this site-type attribute value from PE1 and based on the value prevents establishment of a P-tunnel between itself and the sender site PE1.

As another example, if the first network device 202 is assumed to correspond to sender site PE1 of FIG. 1 and the second network device 204 is assumed to correspond to receiver site PE4 of FIG. 1, the receiver site PE4 transmits its current site-type attribute value 02 indicating that it is a receiver site. The sender site PE1 receives this site-type attribute value from PE4 and based on the value permits establishment of a P-tunnel between itself and the receiver site PE4.

In some embodiments, a given PE element that originates a BGP I-PMSI or S-PMSI A-D route will attach the above-described MVPN site-type attribute to the route. The receiving PE element of the route is thereby informed as to whether the originating PE element is a sender site, receiver site or a sender-receiver site. If the site-type attribute is absent in the I-PMSI or S-PMSI A-D route, the receiving PE element will instead utilize the default value 00 and as a result will consider the originating PE element to be designated as a sender-receiver site.

If a PE element with existing P-tunnels to other PE elements has its site type changed so as to become a sender site or a receiver site, a new I-PMSI or S-PMSI A-D route may be sent with the new MVPN site-type attribute.

By way of example, a PE element receiving an I-PMSI or S-PMSI A-D route with an MVPN site-type attribute may be configured to perform the actions below based on the value of the site-type attribute.

1. If the site-type attribute in the I-PMSI or S-PMSI A-D route is received with a value indicating a sender site, then the receiving PE element will not originate P-tunnels to the PE element which originated the I-PMSI or S-PMSI A-D route.

2. If the site-type attribute in the I-PMSI or S-PMSI A-D route is received with a value indicating a receiver site or a sender-receiver site, then the receiving PE element will originate P-tunnels to the PE element which originated the I-PMSI or S-PMSI A-D route.

It should be noted that if a given PE element receiving an Intra-AS I-PMSI A-D route has already established a P-tunnel to another PE element and then receives from the latter PE element a new I-PMSI or S-PMSI A-D route with a site-type attribute indicating a sender site, the given PE element accepts the I-PMSI or S-PMSI A-D route and tears down the existing tunnel to the sender site PE element. Here, Intra-AS refers to a route within a BGP source Autonomous System (AS) extended community as defined in accordance with the above-cited RFC 6514.

As another example, assume that the given PE element receiving the Intra-AS I-PMSI A-D route has not already established a P-tunnel to another PE element, because that PE element was previously identified as a sender site. In this case, if the given PE element receives a new I-PMSI or S-PMSI A-D route from the other PE element either without a site-type attribute or with a site-type attribute indicating a receiver site or a sender-receiver site, then the given PE element should set up a new P-tunnel to the other PE element.

The particular process steps and other operations described above in conjunction with the flow diagram of FIG. 3 are exemplary only, and additional or alternative process steps or operations may be used in other embodiments.

Referring again to FIG. 2, each of the network devices 202 and 204 comprises a processor 210 or 220 and a memory 212 or 222. The processor 210 or 220 of such a network device may be implemented utilizing a microprocessor, a microcontroller, an application-specific integrated circuit (ASIC), a field-programmable gate array (FPGA), or other type of processing circuitry, as well as portions or combinations of such processing circuitry. The processor may include one or more embedded memories as internal memories.

The processor 210 or 220 and any associated internal or external memory may be used in storage and execution of one or more software programs for controlling the operation of the corresponding network device 202 or 204. Accordingly, one or more of the modules 206 and 208 of transceiver 205 in network device 202, one or more of the modules 216 and 218 of transceiver 215 in network device 204, or portions of these modules, may be implemented at least in part using such software programs.

Each of the memories 212 and 222 of the network devices 202 and 204 is assumed to include one or more storage areas that may be utilized for program code storage. The memory 212 or 222 may therefore be viewed as an example of what is more generally referred to herein as a computer program product or still more generally as a computer-readable storage medium that has executable program code embodied therein. Other examples of computer-readable storage media may include disks or other types of magnetic or optical media, in any combination.

The memory 212 or 222 may therefore comprise, for example, an electronic random access memory (RAM) such as static RAM (SRAM), dynamic RAM (DRAM) or other types of electronic memory. The term "memory" as used herein is intended to be broadly construed, and may additionally or alternatively encompass, for example, a read-only memory (ROM), a disk-based memory, or other type of storage device, as well as portions or combinations of such devices.

The processor, memory, transceiver and other components of a given network device of communication network 100 may include well-known circuitry suitably modified to implement at least a portion of the tunnel establishment control functionality described above. Conventional aspects of such circuitry are well known to those skilled in the art and therefore will not be described in detail herein.

It is to be appreciated that a given node or associated network device as disclosed herein may be implemented using additional or alternative components and modules other than those specifically shown in the exemplary arrangement of FIG. 2.

As mentioned above, embodiments of the present invention may be implemented at least in part in the form of one or more software programs that are stored in a memory or other computer-readable storage medium of a network device or other processing device of a communication network.

Numerous alternative arrangements of hardware, software or firmware in any combination may be utilized in implementing these and other system elements in accordance with the invention. For example, embodiments of the present invention may be implemented in one or more ASICS, FPGAs or other types of integrated circuit devices, in any combination. Such integrated circuit devices, as well as portions or combinations thereof, are examples of "circuitry" as that term is used herein.

Again, the above-described site-type attributes and tunnel establishment control processes are examples only, and should not be construed as limiting the scope of the invention in any way. In these and other embodiments, the use of site-type attributes allows a given network device to avoid establishing unnecessary tunnels with other network devices that are sender sites of an MVPN. This provides a significant reduction in the amount of control plane and data plane communication associated with the MVPN, and thus a more efficient use of network resources. Such reductions can lead to substantially improved network performance, particularly in large scale networks in which relatively few sender sites multicast to a large number of receiver sites.

These advantages relative to conventional arrangements are achieved without creating any new security issues for IP, BGP, MPLS or other communication protocols of the illustrative embodiments.

Although certain illustrative embodiments are described herein in the context of particular communication protocols such as IP, BGP and MPLS, other types of networks can be used in other embodiments. The term "network" as used herein is therefore intended to be broadly construed.

It should again be emphasized that the embodiments described above are for purposes of illustration only, and should not be interpreted as limiting in any way. Other embodiments may use different types of network, device and module configurations, and alternative communication protocols and process steps for implementing tunnel establishment control functionality based on site-type attributes. Also, it should be understood that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. An apparatus comprising:
   a first network device adapted for communication with at least a second network device;
   the first network device being configured to receive from the second network device a site-type attribute of the second network device and to control establishment of a tunnel between the first network device and the second network device based at least in part on the received site-type attribute;
   wherein the first network device comprises:
   a site-type attribute receiver configured to extract the site-type attribute from a message received from the second network device; and
   a multicast controller coupled to the site-type attribute receiver and configured to prevent setup of the tunnel if the received site-type attribute indicates that the second network device is a sender site of a Multicast Virtual Private Network (MVPN).

2. The apparatus of claim 1 wherein the first and second network devices comprise respective provider elements associated with a Multiple Protocol Label Switching (MPLS) network.

3. The apparatus of claim 1 wherein the site-type attribute is received in the first network device as part of a Border Gateway Protocol (BGP) message transmitted by the second network device to the first network device.

4. The apparatus of claim 1 wherein the site-type attribute comprises an MVPN site-type attribute indicating whether the second network device is at least one of a sender site and a receiver site of an MVPN.

5. The apparatus of claim 4 wherein the MVPN site-type attribute is configured to take on a particular one of a plurality of different possible values including a first value indicating that the second network device is both a sender site and a receiver site of the MVPN, a second value indicating that the second network device is a sender site of the MVPN, and a third value indicating that the second network device is a receiver site of the MVPN.

6. The apparatus of claim 5 wherein the first value is a default value of the MVPN site-type attribute.

7. The apparatus of claim 1 wherein controlling establishment of the tunnel between the first network device and the second network device comprises controlling establishment of a P-tunnel of a Provider Multicast Service Interface (PMSI) between the first and second network devices.

8. The apparatus of claim 1 wherein controlling establishment of the tunnel between the first network device and the second network device comprises preventing setup of the tunnel if the received site-type attribute has a particular predetermined value.

9. The apparatus of claim 8 wherein the particular predetermined value is a value indicating that the second network device is a sender site of an MVPN.

10. A method comprising:
    receiving in a first network device a site-type attribute of a second network device; and
    controlling establishment of a tunnel between the first network device and the second network device based at least in part on the received site-type attribute;
    wherein controlling establishment of the tunnel between the first network device and the second network device comprises preventing setup of the tunnel if the received site-type attribute indicates that the second network device is a sender site of a Multicast Virtual Private Network (MVPN).

11. The method of claim 10 wherein receiving the site-type attribute comprises receiving the site-type attribute as part of a Border Gateway Protocol (BGP) message transmitted by the second network device to the first network device.

12. The method of claim 10 wherein controlling establishment of the tunnel between the first network device and the second network device comprises controlling establishment of a P-tunnel of a Provider Multicast Service Interface (PMSI) between the first and second network devices.

13. The method of claim 10 wherein controlling establishment of the tunnel between the first network device and the second network device comprises preventing setup of the tunnel if the received site-type attribute has a particular predetermined value.

14. The method of claim 13 wherein the particular predetermined value is a value indicating that the second network device is a sender site of an MVPN.

15. An article of manufacture comprising a processor-readable storage medium having embodied therein executable program code that when executed by a processor of the first network device causes the first network device to perform the method of claim 10.

16. An apparatus comprising:
    a first network device adapted for communication with at least a second network device;
    the first network device being configured to transmit to the second network device a site-type attribute of the first network device so as to permit the second network device to control establishment of a tunnel between the second network device and the first network device based at least in part on the received site-type attribute;
    wherein the first network device comprises:
    a site-type attribute transmitter configured to insert the site-type attribute into a message transmitted to the second network device; and
    a multicast controller coupled to the site-type attribute transmitter and configured to provide the site-type attribute to the site-type attribute transmitter wherein the site-type attribute indicates if the first network device is a sender site of a Multicast Virtual Private Network (MVPN).

17. The apparatus of claim 16 wherein the site-type attribute is transmitted as part of a Border Gateway Protocol (BGP) message transmitted by the first network device to the second network device.

18. The apparatus of claim 16 wherein the site-type attribute comprises a transitive BGP attribute that is advertised by the first network device to the second network device and one or more additional network devices associated with a corresponding auto-discovery (A-D) route.

19. A method comprising:
    transmitting a site-type attribute of a first network device to a second network device so as to permit the second network device to control establishment of a tunnel between the second network device and the first network device based at least in part on the received site-type attribute;

wherein the site-type attribute is inserted into a message transmitted by the first network device to the second network device; and wherein the site-type attribute indicates if the first network device is a sender site of a Multicast Virtual Private Network (MVPN).

20. An article of manufacture comprising a processor-readable storage medium having embodied therein executable program code that when executed by a processor of the first network device causes the first network device to perform the method of claim 19.

\* \* \* \* \*